(12) United States Patent
Gueclue et al.

(10) Patent No.: US 11,608,286 B2
(45) Date of Patent: Mar. 21, 2023

(54) GLASS MELTING FURNACE

(71) Applicant: INTERNATIONAL PARTNERS IN GLASS RESEARCH, Aachen (DE)

(72) Inventors: Fatih Mehmet Gueclue, Aachen (DE); Christian Roos, Schlangenbad (DE)

(73) Assignee: INTERNATIONAL PARTNERS IN GLASS RESEARCH, Aachén (DE)

( * ) Notice: Subject to any disclaimer, the term of this patent is extended or adjusted under 35 U.S.C. 154(b) by 110 days.

(21) Appl. No.: 17/564,553

(22) Filed: Dec. 29, 2021

(65) Prior Publication Data
US 2022/0194838 A1 Jun. 23, 2022

Related U.S. Application Data

(63) Continuation of application No. PCT/EP2020/068609, filed on Feb. 7, 2020.

(30) Foreign Application Priority Data

Jul. 4, 2019 (EP) ..................................... 19184404

(51) Int. Cl.
*C03B 5/185* (2006.01)
*C03B 5/03* (2006.01)

(52) U.S. Cl.
CPC ................ *C03B 5/185* (2013.01); *C03B 5/03* (2013.01)

(58) Field of Classification Search
None
See application file for complete search history.

(56) References Cited

U.S. PATENT DOCUMENTS

| 1,905,534 A | 3/1933 | Harold |
| 2015/0307382 A1 | 10/2015 | Wang |

FOREIGN PATENT DOCUMENTS

WO WO2014036979 A1 3/2014

OTHER PUBLICATIONS

DE 20 2018 105 160 machine translation, Glass Service, Melting chamber of a continuous glass melting furnace and glass melt obtained by a process carried out therein, Jan. 2019 (Year: 2019).*
CN 1022905C machine translation, Trevelyan et al., Glass Melting Tank and a method for forming a molten glass, Dec. 1993 (Year: 1993).*
FR 2 787 784 machine translation, Stein Heurtey, Glass melting and refining furnaces are improved, Jun. 2000 (Year: 2000).*

* cited by examiner

*Primary Examiner* — Queenie S Dehghan
(74) *Attorney, Agent, or Firm* — Von Rohrscheidt Patents

(57) ABSTRACT

A glass melting furnace including a melt chamber configured to receive a glass melt which forms a glass melt top surface; at least one batch feeder configured to feed batch material into the melt chamber below a level of the glass melt top surface, the batch feeder arranged at a side wall, a back wall, or a bottom of the melt chamber, plural electrodes arranged in the melt chamber below the level of the glass melt top surface and configured to heat the glass melt, the electrodes spaced apart from each other, wherein the electrodes are arranged so that a flow with a horizontal and a vertical component of movement is created in the glass melt, wherein the electrodes are arranged so that a helical flow in the glass melt is created with an axis of rotation substantially perpendicular to the glass melt top surface.

15 Claims, 5 Drawing Sheets

GLASS MELTING FURNACE

RELATED APPLICATIONS

This application is a continuation of International Application PCT/EP2020/068609 filed on Jul. 2, 2020, claiming priority from European Patent Application EP 19184404.2 filed on Jul. 4, 2019, both of which are incorporated in their entirety by this reference.

FIELD OF THE INVENTION

The present invention relates to a glass melting furnace and to a method for melting glass in a glass melting furnace.

BACKGROUND OF THE INVENTION

Glass melting furnaces are commonly known in the state of the art. Typically, glass furnaces can be grouped according to the location of the energy source (U flame or cross fired furnaces), depending on the type of the oxidant (oxygen or air) and also depending on the quality of the produced glass such as container, tableware, float or fiberglass. The present invention concerns all types of glass melting furnaces mentioned before.

Since the production of glass in a glass melting furnace runs continuously, raw batch material is regularly added to the glass melt in the melt chamber, whereas good quality glass is continuously pulled from the furnace for the production. In common furnaces the raw batch material, also named as batch, is added to the furnace in powder form by distributing the same on top of the existing glass melt. The batch material then remains on the glass melt for a while and forms a kind of blanket, that acts as an insulation layer between the flames of the burners arranged above the glass melt and the glass melt itself. Batch melting takes long time because of insulation properties heat penetration is slow inside batch blanket which results in core of batch blanket is always near to room temperature. Consequently, the amount of heat energy that is transferred from the burners to the glass melt decreases. However, the batch blanket takes energy from the burners and also from the molten glass by the help of recirculation flow. This recirculation flow takes energy to the bottom of the batch blanket but it also causes to mix fresh cold melt which contains a lot of air encapsulations (bubbles) with the hot glass which has stayed in the furnace for a certain time with reduced bubbles. This mixing process extends the refining process of the glass melting and yields to high energy consumption. However, in conventional furnaces this mixing is unavoidable due to the temperature gradient of the furnace and the melting nature of glass.

To solve this problem, the document US 2015/0307382 A1 points out the introduction of the batch into the melt chamber takes place below the melt level, wherein the batch is preheated so that the disadvantages about an insulating layer on top of the melt, if the batch is introduced on top of the glass melt, are partially avoided. However, the batch material tends to flow up to the top of the melt so that a part of the batch material again acts as a barrier as regards the heat emitted by the burners. Consequently, in this document the effective mixing is not addressed and process between the batch material and the glass melt remains difficult and time consuming.

From document WO 2014/036979 A1 a glass melting furnace is known having a row of electrodes being arranged in the bottom of the melt chamber to create a spiral flow, the axis of the flow spiral being horizontal. This patent is related to dissolution of sand particles and removal of bubbles in molten glass which is melted in another compartment of a glass furnace. The difference between this document and the present invention is that in the latter the batch is directly fed into the molten glass. A drawback of the state of the art solution is that bubbles can be remained in the molten glass as the spiral flow can cause to remain the bubbles inside the molten glass.

BRIEF SUMMARY OF THE INVENTION

The problem to be solved with the present invention is to further develop a melting furnace in such a way that a mixing of the glass melt and the raw material is optimized.

Improving upon the known glass melting furnace described supra the object is achieved by a glass melting furnace including a melt chamber configured to receive a glass melt which forms a glass melt top surface; at least one batch feeder configured to feed batch material into the melt chamber below a level of the glass melt top surface, the batch feeder arranged at a side wall, a back wall, or a bottom of the melt chamber, plural electrodes arranged in the melt chamber below the level of the glass melt top surface and configured to heat the glass melt, the electrodes spaced apart from each other, wherein the electrodes are arranged so that a flow with a horizontal and a vertical component of movement is created in the glass melt, wherein the electrodes are arranged so that a helical flow in the glass melt is created with an axis of rotation substantially perpendicular to the glass melt top surface, wherein a distance between an entry feeding cross section of the batch feeder and a first electrode of the electrodes is in a range between 0.5 m and 1.5 m in a top view, wherein a distance of the electrodes from the glass melt top surface decreases starting from an electrode with a largest distance from the glass melt top surface when moving along a flow direction of the glass melt.

The object is also achieved by a method for melting glass in a glass melting furnace, the furnace including a melt chamber configured to receive a glass melt which forms a glass melt top surface, at least one batch feeder configured to feed batch material into the melt chamber below a level of the glass melt top surface, the batch feeder arranged at a side wall, a back wall, or a bottom of the melt chamber, plural electrodes arranged in the melt chamber below the level of the glass melt top surface configured to heat the glass melt, the electrodes spaced apart from each other, the method including mixing a batch to be conveyed into the melt chamber with a glass melt already present in the melt chamber; creating a flow in the glass melt with a horizontal and a vertical component of movement by the electrodes; creating a helical flow with an axis of rotation substantially perpendicular to the melt top surface by the electrodes; wherein a distance between an entry feeding cross section of the batch feeder and a first electrode of the electrodes is in a range between 0.5 m and 1.5 m in a top view, wherein a distance of the electrodes from the glass melt top surface decreases starting from an electrode with a largest distance from the glass melt top surface when moving along a flow direction of the glass melt.

Consequently, the batch material does not float up to the top surface of the melt, but remains within the melt in an area below the top surface. The raw material cannot take the short (vertical) way to the surface, but is urged to flow along an extended path through the melt in comparison with the known furnaces. The raw material is routed through the melt by means forces created within the material by the electrical field caused by the electrodes. Therefore, the batch material is completely surrounded by hot melt for a much longer time so that the raw material itself is optimally heated and melts much faster than usual. Advantageously, if the flow moves approximately in a horizontal plane an optimal mixing between the batch material and the melt is caused.

According to the invention, the top surface of the melt is kept free from unmolten raw material so that the heat transfer from the hot burner flames to the melt is improved due to the increased thermal conductivity on the surface.

If the electrodes are arranged in such a way that a circular flow in the melt is created with an axis of rotation being substantially perpendicular to the melt top surface, it is not required that the created circular flow of the melt is exactly circular according to the invention. Depending on the geometry of the melting chamber the created flow can be oval, elliptical or similarly as well.

It is only required that a flow is generated within the melt and spaced apart to the top surface of the melt. So, the entry of the batch material is controlled.

For example, in a top view of the inventive furnace, the electrodes could be arranged in a circle or an oval or a rectangle for creating the circular flow in the melt with an axis of circulation being substantially perpendicular to the melt top surface. It is evident that the movement of the batch material does not strictly follow the geometric arrangement of the electrodes so that another arrangement of the electrodes is possible as well.

Depending on the size of the furnace the horizontal distance between two adjacent electrodes should be chosen between 5 and 25% of the furnace width.

In conventional glass melting furnaces the glass melt is also circulating but the circulation has an axis of rotation being substantially parallel or slightly inclined to the plane of the melt top surface. Temperature difference between the cold batch and the hot molten glass creates glass flows in the furnace which starts from the hot spot of the furnace to the batch feeding area. A hot spot is an imaginary point that is formed by the flames. For example, in U flame furnaces the length of the flame defines the position of the hot spot, however, in cross fired furnaces the hot spot is created by changing the fuel ratios of ports.

According to the present invention, the orientation of the axis for the circular flow with respect to the glass melt top surface is changed from a parallel orientation to a substantially perpendicular orientation or strongly inclined to the plane of the melt top surface, the orientation forming a helical shape of batch route from the batch feeding point to the hot spot of the furnace. In this innovation the hot spot of the furnace will be in perpendicular direction and will be adjusted according to the ratio of energy coming from the electrical boosting and the burner flames.

The electrodes are arranged in such a way that a helical flow in the melt is created with a helical axis being substantially perpendicular to the melt top surface, the batch material that is fed below the level of the glass melt top surface flows within the melt and rises continuously higher and higher, whereas the temperature rises as well. After a long distance and time (only one, but also several turns are possible) the batch material has been molten and reaches the top surface as glass melt, where it is further heated by the burner flames. In this way, the total time for melting the batch material and mixing it with glass melt is greatly reduced and consequently, the required energy is reduced significantly.

As regards the helical flow of the melt it is preferable, if a distance of the electrodes from the top surface of the glass melt decreases starting from an electrode with the largest distance from the top surface when moving along a flow direction of the melt. So, the distance between the top surface of the glass melt and the upper part of the electrodes decreases stepwise and the arrangement of the electrodes resembles a staircase. The melt and the conveyed batch material which flow along the electrodes climb continuously in direction of the top surface.

With a flat orientated bottom of the melt chamber a helical flow can be achieved, if the length of the electrodes, measured from the bottom of the melt chamber to a top of the electrode, increases starting from an electrode with the shortest length when moving along a flow direction.

In a top view, the distance between an entry feeding cross section of the batch feeder and a first electrode is in the range of 0.5 m and 1.5 m. The entry feeding cross section of the batch feeder is the cross section of an opening in a corresponding side wall of the batch feeder through which the batch material enters the melt chamber. The first electrode is defined as the electrode with the lowest horizontal distance to said opening and with the maximum vertical distance to the glass melt surface. The distance between the entry feeding cross section of the batch feeder and the first electrode depends on the size of the furnace, which in turn depends on the pull rate of the furnace. As regards the distance described before it is important that the batch material entering the furnace is caught by the circular flow so that the advantages aforesaid advantages arise.

Preferably, pairs of electrodes are connected to each other, alternating current being used for electric boosting of the electrodes. Two electrodes are connected to each other and molten glass closes the circuit. The poles of the connected electrodes are different as positive or negative as well as the phase and current density of the electrodes are different from each other. Consequently, the glass melt is the bridge to conduct the electricity and the glass flows between these two electrodes and carries the batch inside the molten glass. The direction of the ion migration is always constant due to the phase difference.

According to a further preferred embodiment of the invention the electrode with the largest distance from the top surface of the melt and/or the electrode with the shortest length, measured from the bottom of the melt chamber to a top of the electrode, is or are arranged in proximity of the batch feeder. In this way, the batch is optimally caught by the flow starting at the first electrode near the batch feeder.

It is possible to arrange the electrodes so that they protrude from a bottom of the melt chamber. Alternatively, it is possible to fix the electrodes in at least one side wall of the melt chamber so that the electrodes protrude from said sidewall. In the first case they are oriented preferably approximately vertically, in the second case preferably approximately horizontally.

Further, it is possible to arrange electrodes that protrude from the bottom of the melt chamber as well as electrodes that protrude from at least one side wall of the melt chamber. With the help of side wall electrodes vortex flow continues till the top of molten glass. Thus, melting of the batch is enhanced and the mixing of the batch with the molten glass increases.

If electrodes protrude from the bottom of the melt chamber it is further advantageous, if the electrodes are arranged in two circles, in particular in two concentric circles. In this way more heat can be introduced in the melt and the creation of a circular flow of the melt is additionally improved. Consequently, the raw material is routed optimally.

According to an advantageous design of the furnace the melt chamber is divided in a melting area in which the batch is introduced, a fining area with a shallow depth in comparison with the depth of the melting area and a refining area with substantially the same or nearly the same depth as the melting area, at least a depth much larger than in the fining area.

In the fining area of the melt chamber at least one bubbler is preferably arranged to make bubbles in the melt rise to the surface and thus leave the melt. More preferably, a row of bubblers is arranged in the fining area.

According to a preferred embodiment of the inventive furnace, a second row of bubblers or a row of electrodes is arranged in the fining area next to the first row of bubblers. So, the removal of bubbles in the melt is further enhanced. If a row of electrodes is arranged next to the first row of bubblers additional heat is introduced in the molten glass of the refining area.

Advantageously, it is foreseen that the heat output of all electrodes is substantially equal or that the heat output of the electrodes is different and increases with their length.

A particularly advantageous design of the invention has two batch feeders arranged at the same sidewall of the melt chamber spaced apart from each other, wherein, in a top view, the distance between the two batch feeders is in the range of 50% to 120%, preferably in the range of 80% to 90% of the diameter of the circle or mean value of the diameters of the oval formed by the electrodes. The presence of a second feeder has several advantages: First, it is possible to feed the double amount of raw material. Further, it is possible to use both feeders alternately. In the event that one feeder fails or requires maintenance, operation of the furnace can be maintained via the second feeder. The result is a redundant system. Further, it is possible to arrange more feeders depending on the shape of the furnace. If the furnace is octagonal four feeders can be arranged in each wall pair of the octagonal.

Additionally, there is a further advantage of the invention: In conventional technology use of raw materials is limited due to different drawbacks to furnace and regenerators, for example NaOH or calcinated raw materials cannot be used for dusting properties of these materials and reactions with refractories. According to the invention use of calcinated raw materials and NaOH can be realized due to submerged feeding of the raw materials which will eliminate the dusting and corrosion reactions with refractories since the vortex melting offers enough time for melting raw materials before they reach the top of the molten glass.

As regards the batch feeder it is preferable to arrange it close to the bottom of the melt.

Particularly, a lowest point of the entry of the batch conveyed by the batch feeder into the melt chamber is positioned in a distance from the bottom of the melt chamber in the range of 15% to 75% of the total glass depth. It is necessary to have a certain distance between the batch feeder and the bottom of the melt chamber, because some molten glass below the batch that is just fed into the melt chamber is needed.

A preferred embodiment of the invention proposes that the melt chamber has an octagonal floor plan. An octagonal shape resembles a circle so that the shape of the melt chamber is adapted to a circular arrangement of the electrodes as well as to a circular flow of the melt.

With regard to the method for melting glass in a glass melting furnace, the furnace including
 a melt chamber suitable for receiving a glass melt which forms a top surface,
 a batch feeder for feeding said batch material into the melt chamber below the level of the glass melt top surface, the batch feeder being arranged at a side wall of the melt chamber, multiple electrodes being arranged in the melt chamber below the level of the glass melt top surface for heating the melt, the electrodes being spaced apart from each other, wherein the batch to be conveyed into the melt chamber is to be mixed with a glass melt already being present in the melt chamber wherein by means of the electrodes a flow is created in the melt with a horizontal and a vertical component of movement, the problem is solved by creating a helical flow in the melt with an axis of rotation being substantially perpendicular to the melt top surface by means of the electrodes, in a top view, the distance between an entry feeding cross section of the batch feeder and a first electrode is in the range of 0.5 m and 1.5 m and wherein a distance of the electrodes from the top surface of the glass melt decreases starting from an electrode with the largest distance from the top surface when moving along a flow direction of the melt. The advantages resulting from this inventive method are analogous to those resulting from the device described above.

BRIEF DESCRIPTION OF THE DRAWINGS

The present invention is illustrated with reference to the appended FIGS., wherein.

DETAILED DESCRIPTION OF THE INVENTION

Figure 1:
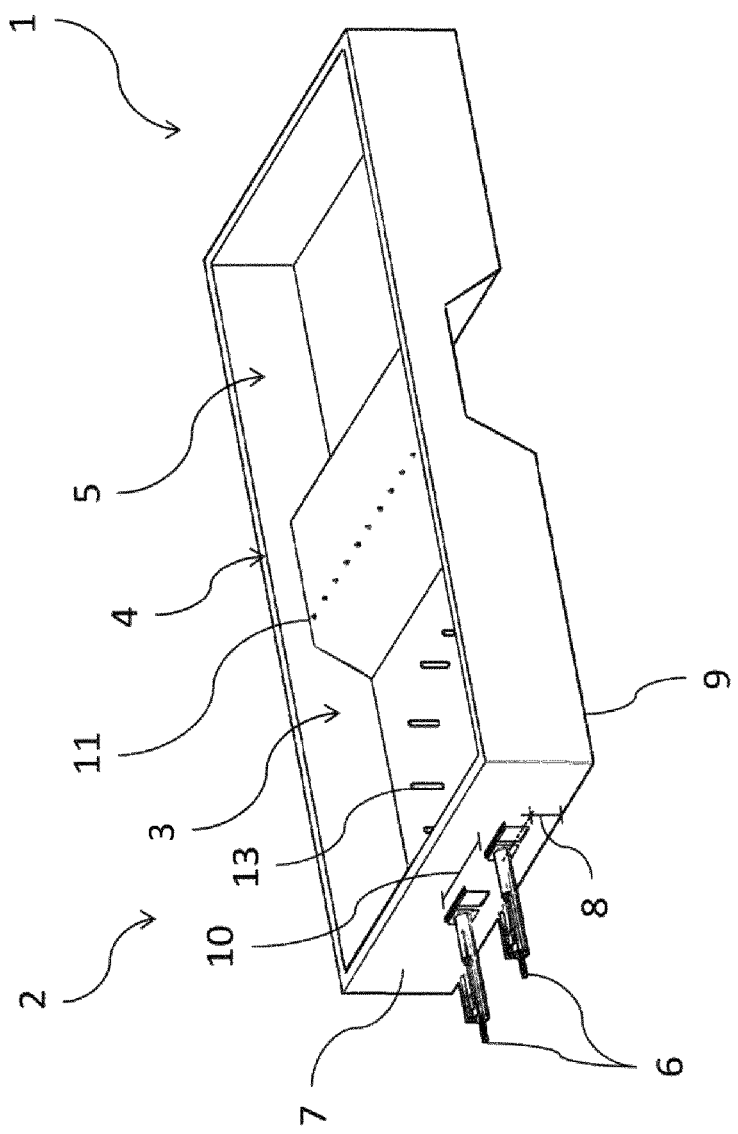
FIG. 1 illustrates a three-dimensional view of an inventive furnace.

FIG. 1 shows an example for an embodiment of an inventive glass melting furnace 1 in a three-dimensional view, the furnace 1 being suitable for receiving a glass melt with a top surface. The inventive furnace 1 comprises a melt chamber 2, which is divided in a melting area 3 in which batch material is introduced, a fining area 4 with a shallow depth in comparison with a depth of the melting area 3 and a refining area 5 with substantially the same depth as the melting area 3. Further, the furnace 1 includes two batch feeders 6 arranged in a side wall 7 of the melt chamber 2, the feeders 6 being designed to feed batch material into the melt chamber 2 below the level of the glass melt top surface. A vertical distance 8 between the batch feeders 6 and a bottom 9 of the melting area 3 is 0.7 m and a horizontal distance 10 between the two batch feeders 6 is 1.5 m.

In the fining area 4 a row of bubblers 11 is arranged to make bubbles 12 in the melt rise to the top surface and thus leave the melt.

In the melting area 3 eight electrodes 13 are arranged in a circle, the electrodes 13 being described in more detail in connection with FIG. 2.

Figure 2:
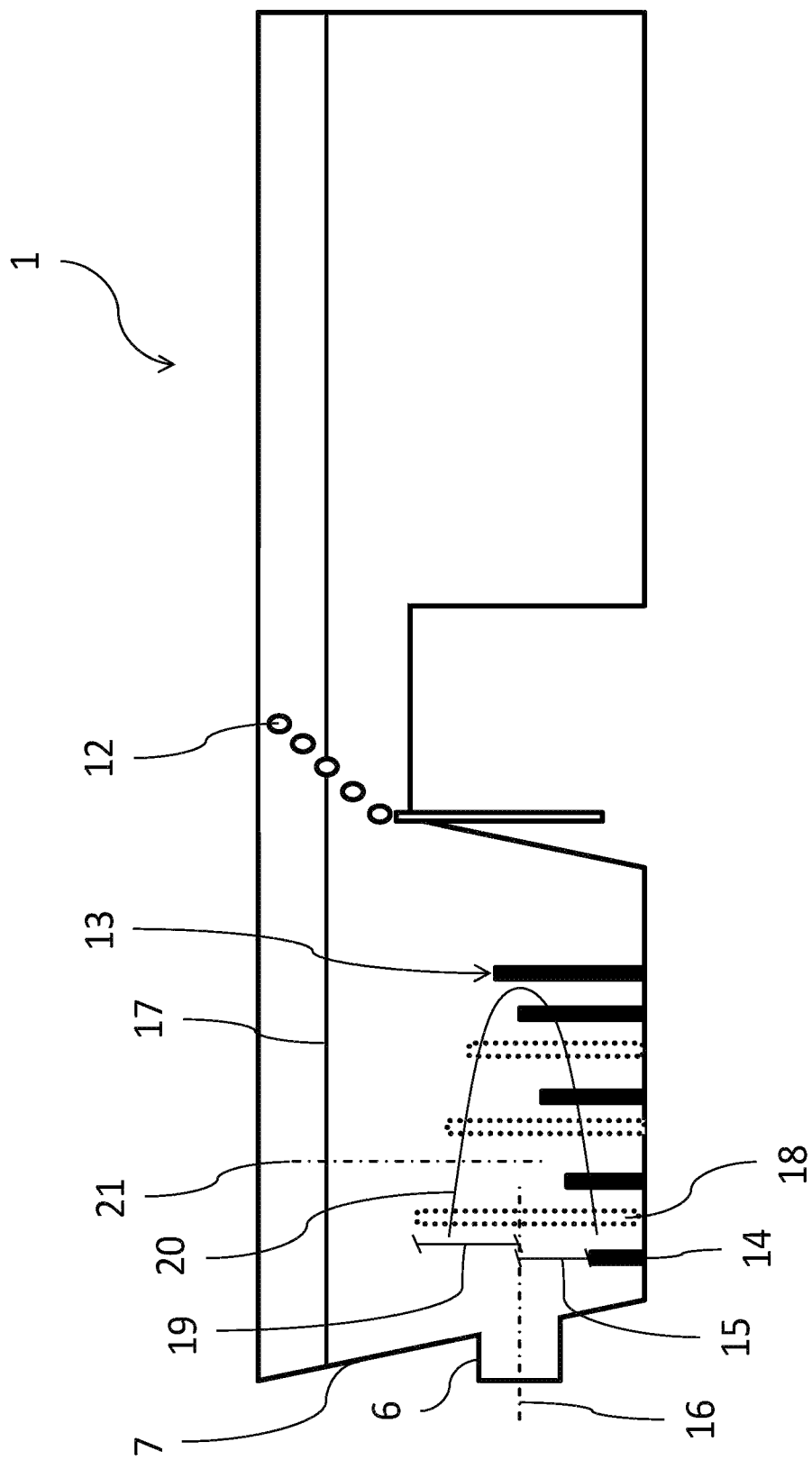
FIG. 2 illustrates a vertical section through the furnace of FIG. 1.

FIG. 2 shows a vertical section through the furnace 1 of FIG. 1 and it is seen that the electrodes 13 protrude from the bottom 9 of the melt chamber 2 and have different lengths. A first electrode 14 is positioned near to the side wall 7 in which the feeders 6 are arranged, the first electrode 14 being the shortest compared to the other electrodes 13. An upper end of the first electrode 14 ends in a distance 15 to a center axis 16 of the feeders 6, the distance 15 being in a range between 5% to 30% of the total glass depth. The length of the adjacent electrodes 13 increases stepwise so that the upper ends of the electrodes 13 describe a helix.

In other words a distance of the electrodes 13 from the top surface of the glass melt, which is symbolized with a line 17, decreases starting from the first electrode 14 with the largest distance from the top surface. The upper end of the highest electrode 18 ends in a distance 19 to a center axis 16 of the feeders 6, the distance 15 being in a range between 5% to 30% of the total glass depth.

The electrodes 13, 14, 18 are connected to each other in such a way that a helical flow 20 of melt is created corresponding to the upper ends of the electrodes 13, 14, 18. Therefore, batch material is carried by the helical flow 20 so that a flow of batch material is achieved with a horizontal component of movement. In this way mixing of batch material with molten glass is improved. The helical flow 20 has an axis of rotation 21 substantially perpendicular to the melt top surface.

Figure 3:
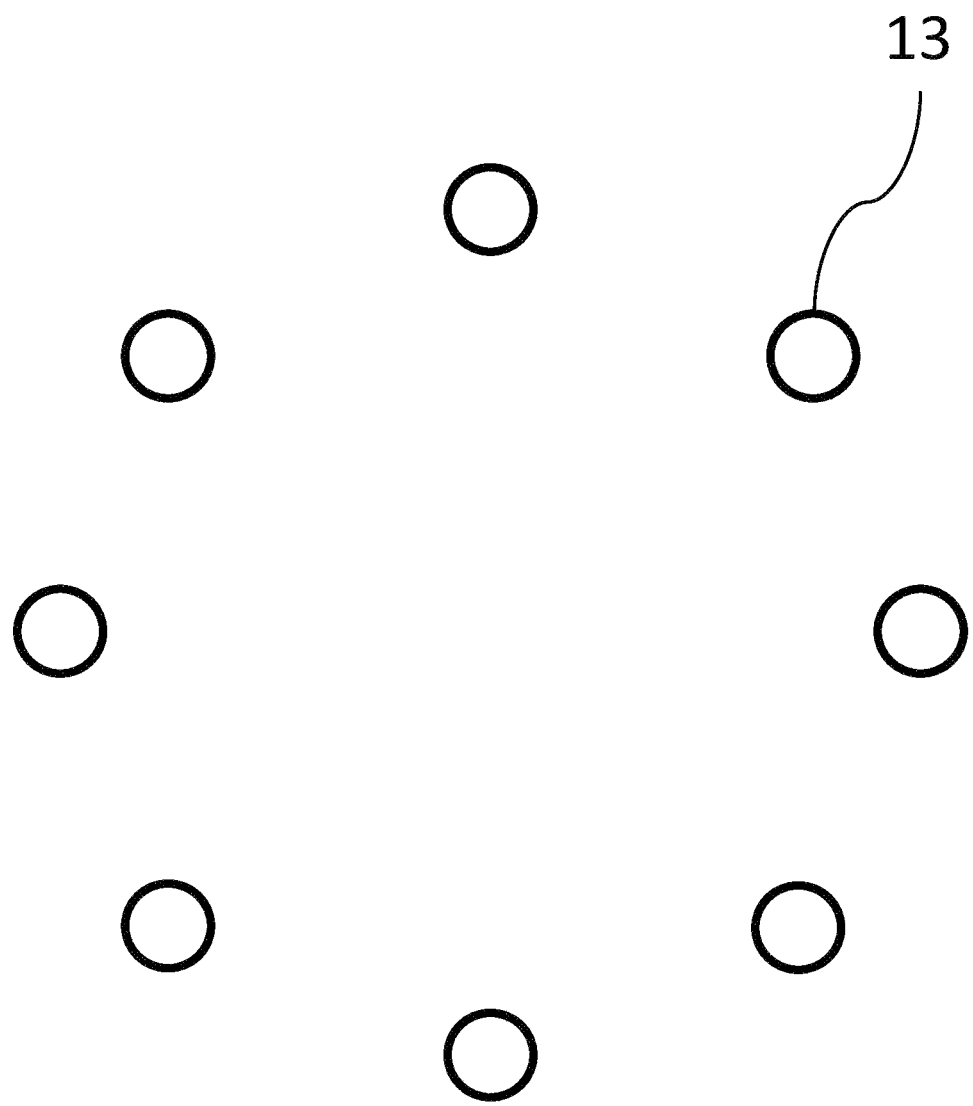
FIG. 3 illustrates a top view of the melting area of the furnace shown in FIG. 1.

A top view of the melting area 3 is shown in FIG. 3 in which the circular arrangement of the electrodes 13, 14, 18 is seen.

Figure 4:
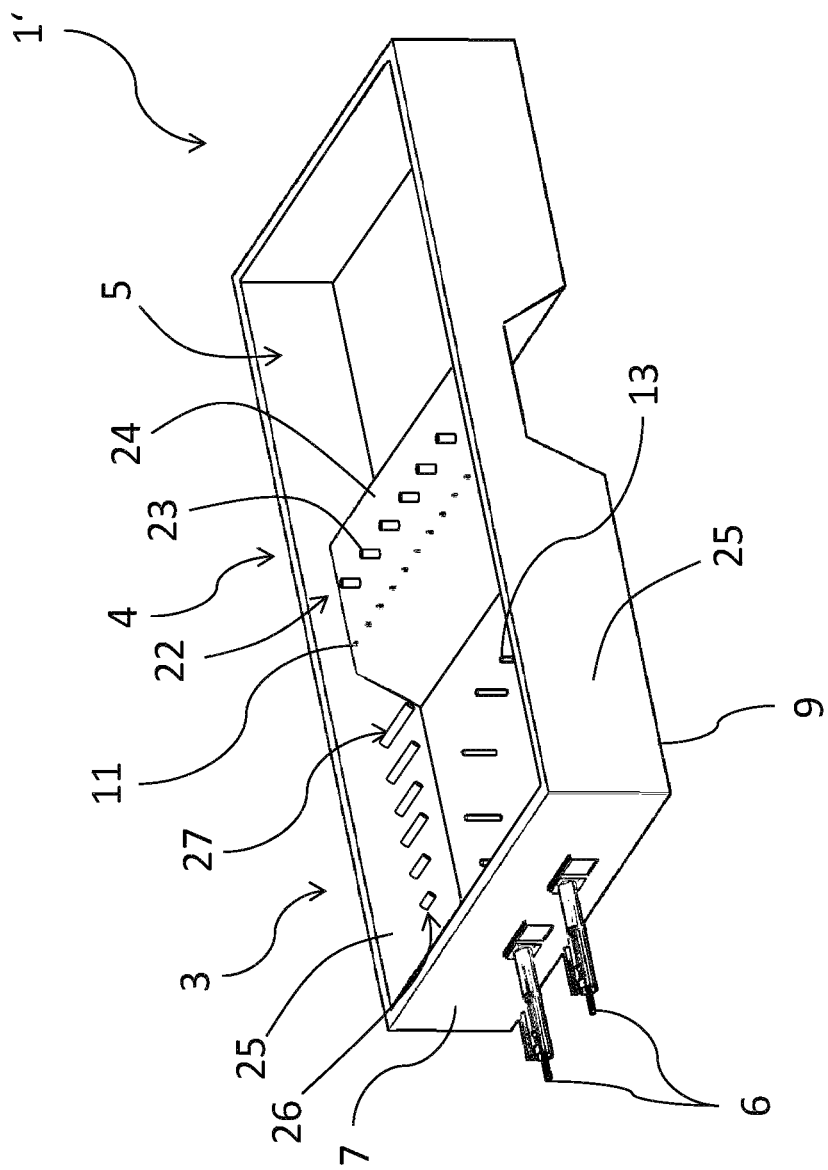
FIG. 4 illustrates a three-dimensional view of a second inventive furnace.

An alternative embodiment of an inventive furnace T is shown in FIG. 4, which shows the furnace T in a three-dimensional view. The furnace T shown in FIG. 4 differs from the furnace 1 shown in FIG. 1 in the additional arrangement of a row 22 of electrodes 23 which is arranged next to the row of bubblers 11 in the fining area 4. The electrodes 23 protrude vertically from a bottom 24 of the fining area 4 and are all of the same length. With the electrodes 23 supplemental heat can be introduced into the melt in the fining area 4.

The furnace T has further electrodes 13 arranged in the bottom 9 of the melting area 3 the arrangement being identical to the arrangement of the furnace 1 shown in FIG. 1. In addition, two opposite side walls 25 of the melt chamber 2 each contain a row 26 of electrodes 27 which protrude from said side walls 25 and thus run horizontally. All electrodes 27 are arranged in the same height. Starting from the electrode 27 with the smallest distance to the side wall 7 of the batch feeders 6, the length of the electrodes 27 of one row 26 increases with the distance of the electrodes 27 from the side wall 7 with the feeders 6. The electrodes 27 arranged in the side walls 25 cause a continuation of the vortex flow till the top of the molten glass. The electrodes 27 in the side wall 25 in front of the FIG. 4 can't be seen because they are hidden by the front side wall 25.

Figure 5:
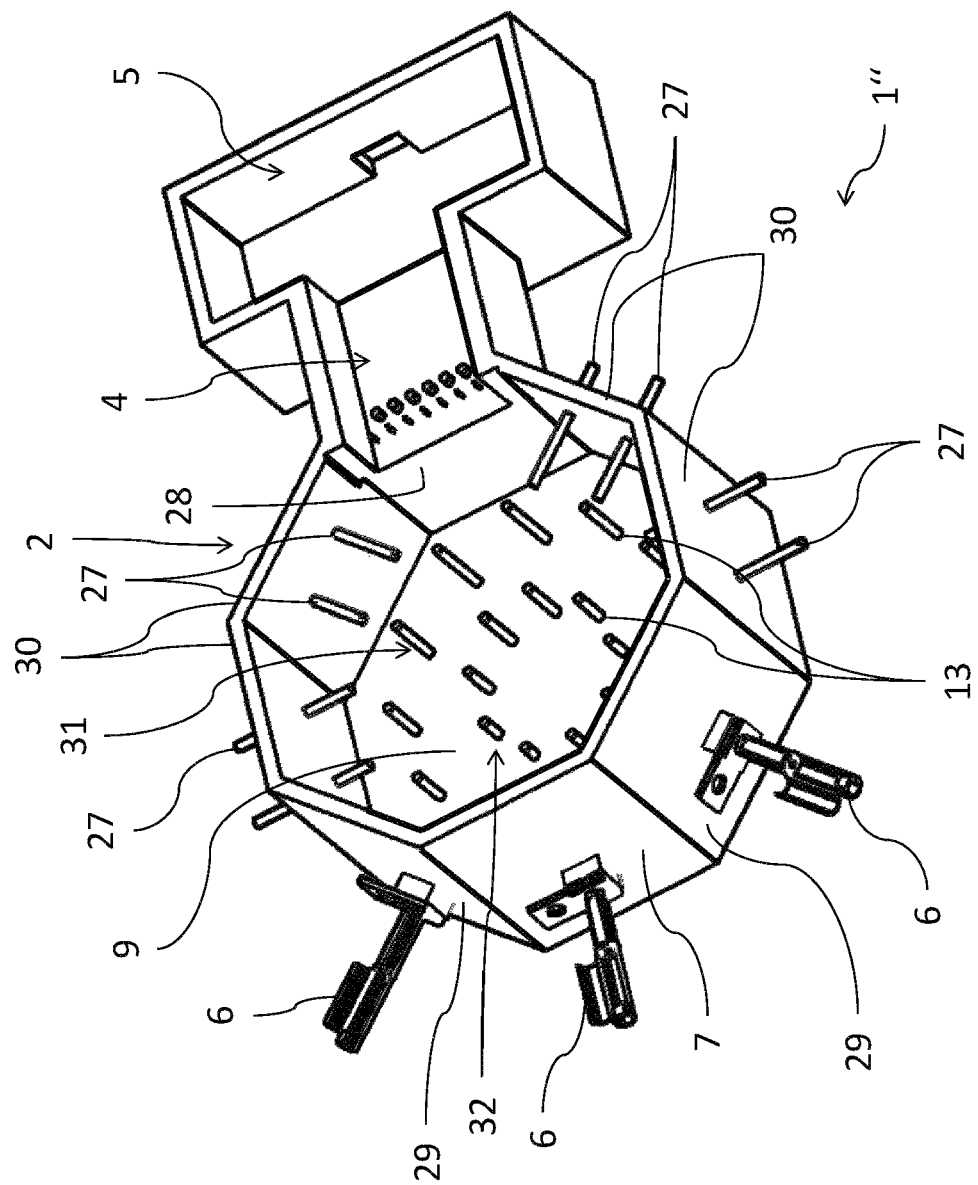
FIG. 5 illustrates a three-dimensional view of a third inventive furnace.

Further, a third example of an embodiment of an inventive furnace 1" is shown in FIG. 5 in a three-dimensional view. The melt chamber 2 has an octagonal floor plan with eight side walls 7, a side wall 28 next to the fining area 4 being lower than the other seven side walls 7. This is caused by the fact that the melting area 3 has a deeper depth as the fining area 4 with a shallow depth.

In each of the three side walls 29 opposite the fining area 4 a batch feeder 6 is arranged. In each of the remaining four side walls 30 two electrodes 27 are arranged, which project horizontally into the melt chamber 2. The fining area 4 has a rectangular floor plan, a width of the fining area corresponding approximately to the adjacent side wall 28 of the melt chamber 2. The refining area 5 with substantially the same depth as the melting area 3 has also a rectangular floor plan, but a width of the refining area 5 is greater than the width of the fining area 4.

Further, the embodiment shown in FIG. 5 has electrodes 13 protruding from the bottom 9. The electrodes 13 are arranged in two concentric circles 31, 32, the electrodes 13 of the inner circle 32 having a shorter length than the electrodes 13 of the outer circle 31. The length of the electrodes 13 of each circle 31, 32 differs analogous to the electrodes 13 of the embodiment shown in FIG. 1.

REFERENCE NUMERALS AND DESIGNATIONS

1, 1', 1" glass melting furnace
2 melt chamber
3 melting area
4 fining area
5 refining area
6 batch feeder
7 side wall
8 distance
9 bottom
10 distance
11 bubbler
12 bubble
13 electrode
14 first electrode
15 distance
16 center axis
17 line
18 highest electrode
19 distance
20 helical flow
21 axis of rotation
22 row
23 electrode
24 bottom
25 side wall
26 row
27 electrode
28 side wall
29 side wall
30 side wall
31 outer circle
32 inner circle

What is claimed is:
1. A glass melting furnace, comprising:
a melt chamber configured to receive a glass melt which forms a glass melt top surface;
at least one batch feeder configured to feed batch material into the melt chamber below a level of the glass melt top surface, the batch feeder arranged at a side wall, a back wall, or a bottom of the melt chamber,
plural electrodes arranged in the melt chamber below the level of the glass melt top surface and configured to heat the glass melt, the electrodes spaced apart from each other,
wherein the electrodes are arranged so that a flow with a horizontal and a vertical component of movement is created in the glass melt, wherein the electrodes are arranged so that a helical flow in the glass melt is created with an axis of rotation substantially perpendicular to the glass melt top surface, wherein a distance between an entry feeding cross section of the batch feeder and a first electrode of the electrodes is in a range between 0.5 m and 1.5 m in a top view, wherein a distance of the electrodes from the glass melt top surface decreases starting from an electrode with a largest distance from the glass melt top surface when moving along a flow direction of the glass melt.

2. The glass melting furnace according to claim 1, wherein a pair of electrodes is connected with each other.

3. The glass melting furnace according claim 1, wherein a length of the electrodes, measured from the bottom of the melt chamber to a top of the electrodes increases starting from an electrode with a shortest length when moving along the flow of the glass melt.

4. The glass melting furnace according to claim 1, wherein an electrode of the electrodes with a largest distance from the glass melt top surface or an electrode of the electrodes with a shortest length, measured from the bottom of the melt chamber to a top of the electrode, is arranged proximal to the batch feeder.

5. The glass melting furnace according to claim 1, wherein the electrodes protrude from the bottom of the melt chamber.

6. The glass melting furnace according to claim 5, wherein the electrodes are arranged in two circles or in two concentric circles.

7. The glass melting furnace according to claim 1, wherein the electrodes are fixed in and protrude from at least one sidewall of the melt chamber.

8. The glass melting furnace according to claim 1, wherein the melt chamber is divided into a melting area in which the batch is introduced, a fining area with a shallow depth in comparison with a depth of the melting area and a refining area with a substantially identical depth as the melting area.

9. The glass melting furnace according to claim 1, wherein at least one row of bubblers is arranged in the fining area of the melt chamber.

10. The glass melting furnace according to claim 1, wherein a second row of bubblers or a row of electrodes is arranged in the fining area next to the at least one row of bubblers.

11. The glass melting furnace according to claim 1, wherein a heat output of all electrodes is substantially equal or the heat output of all electrodes is different and increases with their length.

12. The glass melting furnace according to claim 1,
wherein two batch feeders are arranged at one sidewall of the melt chamber and spaced apart from each other, and
wherein a distance between the two batch feeders is in a range of 50% to 120% of a diameter of a circle or of a mean value of diameters of an oval formed by the electrodes in a top view.

13. The glass melting furnace according to claim 1, wherein a lowest point of an entry of a batch conveyed by the batch feeder into the melt chamber is arranged at a distance from the bottom of the melt chamber in a range of 15% to 75% of a total glass depth.

14. The glass melting furnace according to claim 1, wherein the melt chamber has an octagonal floor plan.

15. A method for melting glass in a glass melting furnace, the furnace including
a melt chamber configured to receive a glass melt which forms a glass melt top surface,
at least one batch feeder configured to feed batch material into the melt chamber below a level of the glass melt top surface, the batch feeder arranged at a side wall, a back wall, or a bottom of the melt chamber,
plural electrodes arranged in the melt chamber below the level of the glass melt top surface configured to heat the glass melt, the electrodes spaced apart from each other, the method comprising:
mixing a batch to be conveyed into the melt chamber with a glass melt already present in the melt chamber;
creating a flow in the glass melt with a horizontal and a vertical component of movement by the electrodes;
creating a helical flow with an axis of rotation substantially perpendicular to the melt top surface by the electrodes;
wherein a distance between an entry feeding cross section of the batch feeder and a first electrode of the electrodes is in a range between 0.5 m and 1.5 m in a top view,
wherein a distance of the electrodes from the glass melt top surface decreases starting from an electrode with a largest distance from the glass melt top surface when moving along a flow direction of the glass melt.

* * * * *